April 2, 1957  P. F. PETERSON  2,787,194
GUN INSTALLATION IN JET AIRCRAFT
Filed Feb. 24, 1955  2 Sheets-Sheet 1

INVENTOR.
PAUL F. PETERSON
BY
William R. Lane
ATTORNEY

April 2, 1957 P. F. PETERSON 2,787,194
GUN INSTALLATION IN JET AIRCRAFT
Filed Feb. 24, 1955 2 Sheets-Sheet 2
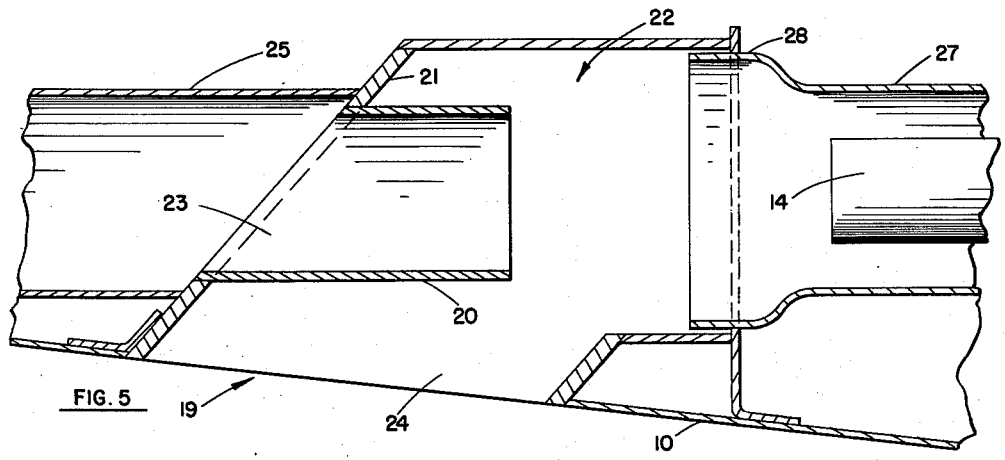
FIG. 5
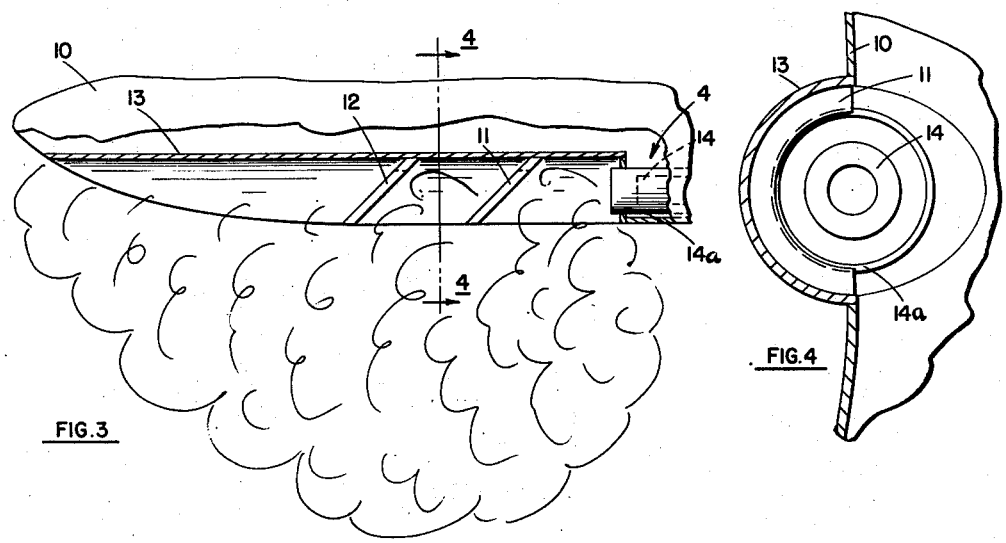
FIG. 3
FIG. 4
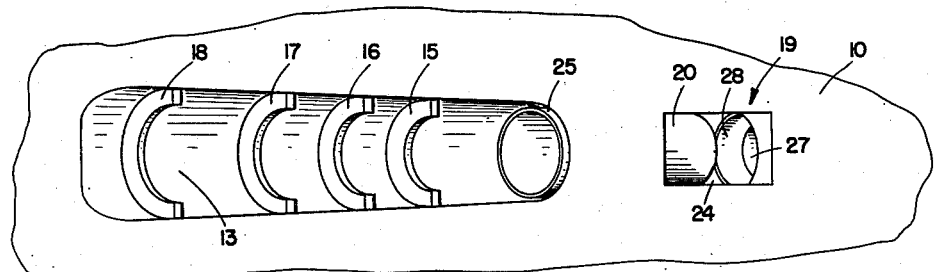
FIG. 6
INVENTOR.
PAUL F. PETERSON
BY
ATTORNEY

United States Patent Office 2,787,194
Patented Apr. 2, 1957

2,787,194

GUN INSTALLATION IN JET AIRCRAFT

Paul F. Peterson, Palos Verdes Estates, Calif., assignor to North American Aviation, Inc.

Application February 24, 1955, Serial No. 490,216

10 Claims. (Cl. 89—37.5)

This invention pertains to a gun installation, and more particularly to an installation for guns in a jet aircraft which protects the engine of the aircraft.

A convenient and common location for guns in aircraft is near the forward portions thereof with one or more guns on either side of the fuselage or engine nacelle directed to fire forwardly. Such an arrangement has obvious advantages from an aerodynamic standpoint as well as convenience of installation and facility of sighting and firing the guns. However, with the advent of new and more highly powered automatic guns, a serious difficulty has been encountered with such installations. If the guns are fired when the aircraft is at a relatively high altitude and low Mach number, a compressor stall or flame-out of the engine will often occur, both extremely serious conditions which can result in loss of the aircraft or at best a drastically decreased speed and altitude. The first symptom of a compressor stall is a rapid rise in engine tailpipe temperature which, in a matter of seconds, can virtually destroy the engine. This is accompanied by great vibrations and a considerable loss of thrust. If the pilot does not then bail out of the aircraft he must dive to gain speed which can eventually overcome the compressor stall, or chop the throttle and then attempt a difficult air restarting of the engine. At slightly higher altitudes the firing of the guns may cause a flame-out of the engine, thus completely stopping the engine and necessitating an air start if the aircraft is to be saved. By the provisions of this invention, however, a baffle arrangement is disposed forwardly of the gun muzzle and prevents the gases from entering the engine air intake so as to cause these effects.

Accordingly, it is an object of this invention to prevent harmful effects to an engine from gun firing. Another object of this invention is to permit successful gun installation adjacent an engine air intake. A further object of this invention is to provide a gun installation which will protect the engine while resulting in a minimum of aerodynamic and weight penalty. These and other objects will become apparent from the following detailed description taken in connection with the accompanying drawing in which Fig. 1 is a fragmentary perspective view illustrating a gun installation in the nose of an aircraft aft of an engine air inlet;

Fig. 3 is a top plan view of a baffle arrangement for receiving and deflecting discharge gases from a gun;

Fig. 4 is a sectional view taken along line 4—4 of Fig. 3;

Fig. 5 is an enlarged detail view of an arrangement employing an expansion chamber for receiving gun discharge gases;

Fig. 6 is a fragmentary perspective view of the installation of Fig. 5, and including arcuate baffles logarithmically spaced;

Figure 1:
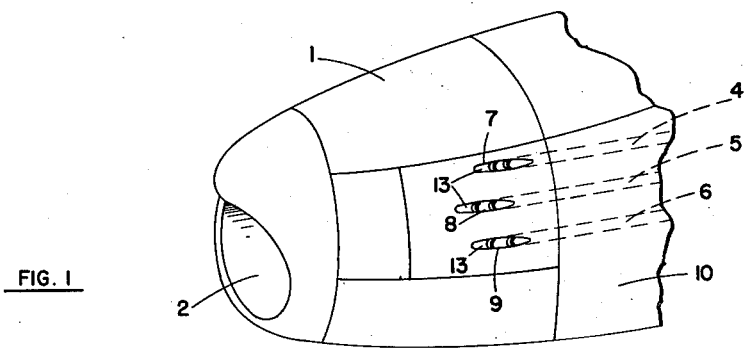

A typical jet aircraft nose 1 may be seen in Fig. 1 provided with an opening 2 to the main duct leading to the intake of the jet engine (not shown) which powers the airplane. The armament of this airplane may comprise a plurality of guns arranged at the nose portion of the aircraft and may be recessed beneath the skin of the aircraft as indicated at 4, 5 and 6. A similar group of guns may be provided on the opposite side of the nose of the aircraft. These guns are normally of the automatic type and will fire forwardly through elongated openings 7, 8 and 9 which are recessed in the skin 10 of the aircraft to provide clearance for the gun to fire. The high power automatic guns which are now coming into use discharge a large volume of gases each time a gun is fired. These gases comprise a high temperature, high pressure, rich mixture which is often still burning as it is emitted from the muzzle of the gun. These gases are expelled violently forwardly and will be carried past the forward end of the nose of the aircraft to the location of opening 2 to the engine air intake duct. As the gases leave the guns they expand in all directions and a large volume will be easily drawn into the air intake duct. This often results in a compressor stall or engine flame-out.

Figure 2:
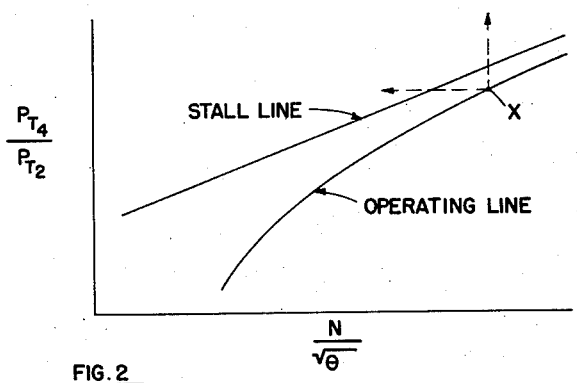
Fig. 2 is a graphical showing illustrating the causes of compressor stall.

The reason for the phenomenon of compressor stall from the discharged gases of the gun can best be understood by reference to Fig. 2. This is a graph in which the ordinate $$\frac{P_{T_4}}{P_{T_2}}$$

represents the ratio of compressor outlet pressure to compressor inlet pressure, increasing in value upwardly. The abscissa is $$\frac{N}{\sqrt{\theta}}$$

where N represents the revolutions per minute of the compressor. Theta is a ratio of the absolute temperature at the compressor inlet divided by 517, which is the sea level static temperature on what is considered a standard day. The lower line of the graph is the normal operating line of the compressor while the upper line represents the stall line, and at conditions above this line a compressor stall will occur. When a compressor stalls, the angle of attack over the individual blades changes becoming too high, and the blades stall out in the same manner as an aircraft wing will stall. The result is that the compressor pumps relatively little air, and severe vibrations are set up which can cause the destruction of the compressor.

It may now be assumed that the aircraft is operating at a condition where the compressor is at point X on the operating curve. This will occur in a typical example when the engine is rotating at substantially its maximum R. P. M. while the aircraft is flying at a relatively low Mach number and at altitude conditions of around 35,000 to 45,000 feet, whereby a low weight of air flow will be pumped by the compressor. The exact operating conditions for compressor stall will vary with different airplanes and gun installations, and often may be encountered at much lower than 35,000 feet. If the guns are then fired and discharge gases from the guns enter the engine air intake duct the compressor can stall from two different effects, although it is believed that a combination of both effects is involved. The gases from the gun explosions are at high temperature and even may be aflame as they enter the engine air intake duct. This causes the value of theta to increase so that there is a decrease in $$\frac{N}{\sqrt{\theta}}$$

As a result the condition of the compressor moves from point X to the left and into the stall range. Also, the gun discharge gases entering the air inlet duct from the side will cause an uneven pressure distribution over the inlet face of the compressor. The compressor is quite sensitive to inlet pressure variations, which can cause the value of $$\frac{P_{T_4}}{P_{T_2}}$$

to increase for some of the blades, throwing the condition of the compressor from point X to up above the stall line. Probably the stall results from a combination of the two factors.

Where the aircraft is operating at still higher altitudes, in the neighborhood of 45,000 feet and above, a flame-out normally occurs from the firing of the guns rather than a compressor stall. This phenomenon probably results because at such altitudes due to the rarified air the engine will operate at only a narrow range of fuel-air ratios. When the discharge gases enter the compressor inlet and pass through the engine it is believed that the burners are starved for oxygen and the flame-out thereupon follows.

By the provisions of this invention the guns may fire under the above reviewed conditions without causing either flame-out or compressor stall. To this end, as may be seen in Figs. 2 and 3, baffle members 11 and 12 are secured to inside wall 13 of the opening for each of the guns. These members are normally arcuate in form as shown, suitably secured in place such as by welding and preferably from a material which will resist high temperatures. These baffles are formed, as best seen in Fig. 3, so that there is sufficient clearance with the firing line of the gun so that there can be no possible interference with the bullet upon discharge of the gun. These baffle members are disposed forwardly of the outlet from the gun muzzle 14 which is disposed in a gun blast tube 14a. In the embodiment illustrated in Figs. 2 and 3, baffles 11 and 12 are inclined forwardly relative to the wall 13 at an angle of 60°. Each baffle, together with the inner wall 13 of the discharge opening, will in effect form a chamber open to the atmosphere on the side remote from the engine air inlet. It is obvious that a design of this type offers very little aerodynamic drag when the airplane is in flight.

When the gun is fired the baffles 11 and 12 will serve to deflect the discharge gases so that these gases will not enter the intake duct in sufficient quantity to cause any deleterious effects. As the gases are driven forwardly from the gun they expand radially in all directions, and the portion of the gases which is directed toward the fuselage will collect behind and engage the first baffle member 11. This will deflect the body of gases outwardly away from the aircraft so that they are exhausted into the wind stream. As the gases are carried further ahead of the gun beyond baffle 11 they will continue to expand radially toward the fuselage and thus will engage baffle 12. Again the gases are deflected outwardly toward the wind stream and by this point the radial of expansion of the gases will have decreased in speed sufficiently so that the gases will never enter the air inlet 2 in any large quantity, but will be carried off by the wind stream around the aircraft. The spacing of these baffles is critical from the standpoint that the first baffle must be located sufficiently ahead of the gun muzzle so that the gases will have had an opportunity to expand radially toward the fuselage an amount so that they will engage and be deflected by the baffle. Similarly, baffle 12 must be ahead of baffle 11 an amount whereby it also will be contacted by the expanding discharge gases. Because of the fact that the expansion rate of the gases decreases as the gases travel farther ahead of the gun the spacing between baffles 11 and 12 will normally be greater than the spacing between the gun and baffle 11. This assures that the second baffle will be contacted by the gases from the gun. Of course the exact spacing of these baffles will depend upon the particular gun involved and the other installation considerations. Likewise the number of baffles employed depends upon the situation for the particular gun installation as well as the gun which is used. In some instances even a single baffle may be adequate, while four or more may be employed at other times.

The 60° angle of baffles 11 and 12 relative to the wall 13 of the gun opening is not primarily for assisting in the deflection of the exhaust gases. Minute solid particles are driven forwardly from the gun when it is fired and the ricochet of these particles may cause damage unless the baffles are inclined as shown so that the particles will be deflected outwardly.

A slightly more complex and highly effective arrangement can be seen in the modification illustrated in Figs. 5 and 6. As in the previously described embodiment, arcuate baffles are disposed within the recessed gun opening. However, in this instance four baffles 15, 16, 17 and 18 are employed. Note that in this instance the baffles are disposed at 90° relative to wall 13 of the gun opening because no severe problem from solid particles at the location of these baffles is present with this particular installation. The baffles are spaced at a progressively greater distance in the form of a logarithmic progression to enable the expanding gases to contact each baffle member despite the decreased expansion rate the further the axial distance from the gun muzzle.

In addition to the baffle members 15, 16, 17 and 18 an expansion chamber assembly 19 is provided with this modification which greatly assists in deflecting the gun discharge gases. In fact, in some instances the expansion chamber assembly can be used alone without the inclusion of the arcuate baffle members. This assembly includes an inner tubular member 20 projecting toward the gun from end wall 21 of chamber 22, forming a restricted outlet 23 for the chamber. A larger side aperture 24 is provided in chamber 22 and is open to the atmosphere. A second tubular member 25, of greater diameter than tube 20, projects on the opposite side of wall 21. The axes of both of these tubular members are in alignment with the axis of the gun barrel and they are of course of a dimension sufficient to permit the bullet to pass therethrough. The gun 14 is disposed within a blast tube 27 the ends of which are flared and enlarged as indicated at 28. As a result, when the gun fires, the enlarged end portion of the blast tube enables initial rapid expansion of the gun discharge gases rather than channeling them forwardly of the gun. Some of the discharge gases will pass through hollow tube 20 and into tube 21. However, a larger portion of the gases will be deflected by the walls of the chamber, including end wall 21, toward aperture 24 and will thus be discharged into the air stream with a sufficient velocity away from the fuselage so that these gases will have no further possibility of going forwardly toward the air intake so as to be drawn therein. Solid particles will be deflected outwardly also, and the angle of end wall 21 assists in effecting this. As the remaining gases pass from tubular member 20 into member 25 they are permitted to continue their expansion because of the larger diameter of the latter tubular member. These expanding gases will then engage baffles 15 through 18 and be deflected in the manner as described for the previous embodiment. As a result very little of the gun discharge gas will go forwardly and toward the air intake for the engine whereby danger of compressor stall or flame-out is entirely obviated.

Figure 7:
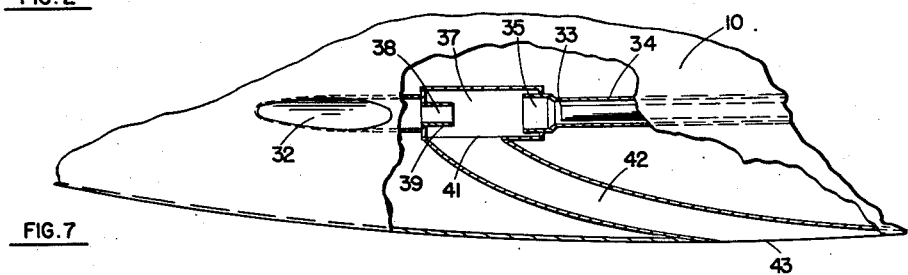
Fig. 7 is a sectional view illustrating an arrangement particularly adaptable to gun installations ahead of an engine air inlet.
Figure 8:
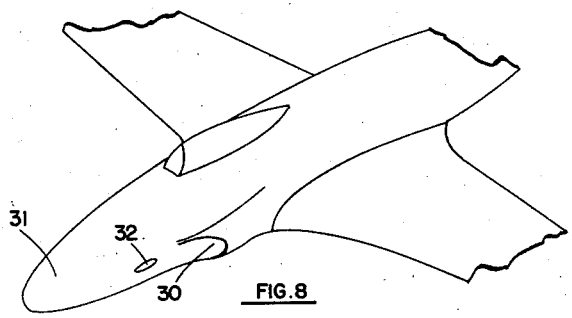
Fig. 8 is a perspective view of the relationship of gun discharge and engine air inlet such as contemplated by the design of Fig. 7.

The arrangement of Fig. 7 is particularly usable where the gun installation is to be in an airplane having an engine air inlet of the type illustrated in Fig. 8. It may be seen in the latter figure that a side engine air intake duct 30 is provided well aft of the forward portion of the nose 31 of the aircraft. The gun will normally be conveniently located to discharge through an elongated slot such as 32 which is disposed forwardly of engine air inlet 30. Such an arrangement is especially bad from the standpoint of compressor stall or flame-out of the engine because the gases from the gun discharging at 32 can very readily be drawn within intake 30 in large quantities. Normally there will be a second similar gun discharge opening and engine air inlet on the opposite side of the fuselage not shown in the Fig. 8. The type of baffle arrangement employing only the arcuate baffles in the elongated discharge slots is not as effective in this instance as in the previously described embodiment because the discharge gases deflected thereby may still be drawn in through the engine air inlet which is disposed aft of the gun discharge opening rather than forwardly thereof. Lateral deflection by such an arrangement as shown before may not be sufficient to clear the periphery of inlet 30. However, the arrangement of Fig. 7 can be successfully employed and will assure that the gun discharge gases are exhausted at a location such that they will not be drawn into the intake of the engine. It can be seen in this figure that gun muzzle 33 is housed in a blast tube 34 having a flared end 35 similar to the arrangement of Fig. 5. An expansion chamber 37 receives the discharge gases from the gun and is provided with a restricted outlet 38 formed by a relatively small tubular member 39 which will permit free passage of the bullet from the gun through the expansion chamber to be discharged at 32. The other and larger outlet aperture 41 of chamber 37 does not discharge directly to the atmosphere but opens into a passageway 42 which, in the illustration of Fig. 7, is directed downwardly and rearwardly from chamber 37. Passageway 42 has an outlet 43 at the bottom portion of the fuselage whereby gases from the gun which enter chamber 37 are conducted through outlet aperture 41, through passageway 42, to be discharged downwardly and rearwardly at 43. It is important that outlet 43 be disposed so that the gun discharge gases will be exhausted at a location remote from inlet 30 thereby assuring that gases will not enter the engine compressor and the difficulties from flame-out and compressor stall will not occur. Thus outlet 43 may be on the underside of the fuselage and aft of inlet 30, or at any rate at a location such that the wind stream around the aircraft does not carry the gases to the engine air inlet. The relatively smaller quantity of gun discharge gases which are carried forwardly through tubular member 39 into slot 32 will be dissipated sufficiently by the time they have traveled back aft to inlet 30 so that harmful effects to the engine will not then occur. If desired additional arcuate baffles could be employed in outlet slot 32 to assist in dissipating these exhaust gases.

It is apparent from the foregoing that I have provided an improved gun installation whereby even large quantities of high temperature and high pressure gun discharge gases will be deflected away from an engine air intake and the danger of compressor stall or flame-out is avoided. Without the provisions of this invention, it would be impossible to install modern high powered guns adjacent the air intake in the manner illustrated in Fig. 1 in any practical manner. All this is accomplished despite the fact that the baffle arrangements are simple to construct, light in weight and offer a minimum aerodynamic penalty.

The foregoing detailed description is to be clearly understood as given by way of illustration and example only, the spirit and scope of this invention being limited only by the appended claims.

I claim:

1. In combination with an aircraft having a gun firing in proximity with an engine air inlet an engine protective device comprising baffle means between said air inlet and said gun projecting laterally away from said inlet and toward the line of fire of said gun, said baffle means being spaced forwardly of said gun sufficiently to encounter expanding discharge gases from said gun thereby to deflect such gases away from said engine air inlet.

2. In combination with an aircraft having a gun firing alongside exterior portions thereof in proximity with and rearwardly of an engine air inlet, an engine protective device comprising at least one substantially arcuate baffle member projecting laterally from fixed portions of said aircraft rearwardly of said engine air inlet adjacent the discharge path of said gun and forwardly of the muzzle outlet of said gun a distance such that expanding discharge gases from said gun contact said baffle member, whereby said baffle member deflects said gases laterally away from said engine air inlet.

3. A device as recited in claim 2 in which said baffle member is inclined forwardly away from said gun.

4. In combination with an aircraft having a gun firing in proximity with an engine air inlet, an engine protective device comprising a baffle means disposed forwardly of said gun and along the discharge path thereof for engaging discharge gases from said gun, said baffle means including outlet means remote from said engine air inlet for permitting dispersal of the gases so deflected.

5. In an aircraft having a gun firing in proximity with and rearwardly of an engine air inlet, an engine protective device comprising a plurality of baffle members projecting from fixed portions of said aircraft toward the line of discharge of said gun and substantially in alignment therewith, the first of said baffle members being spaced forwardly of the muzzle outlet of said gun a distance sufficient to cause said baffle member to be contacted by laterally expanding discharge gases from said gun, successive baffle members being spaced forwardly from said first baffle member at progressively greater distances for enabling each of said baffle members to be contacted by such gases, thereby to deflect the same laterally away from said engine air inlet.

6. In combination with an aircraft having a gun firing in proximity with an engine air inlet an engine protective device comprising expansion chamber means adjacent the muzzle outlet of said gun for receiving a major portion of the discharge gases from said gun while permitting free passage of a projectile from said gun; and outlet means for said expansion chamber means for exhausting said gases at a location remote from said engine air inlet.

7. In an aircraft having a gun firing in proximity with an engine air inlet, an engine protective device comprising an expansion chamber adjacent the muzzle outlet of said gun, said chamber including a restricted outlet axially aligned with said muzzle outlet for permitting free travel of a projectile therethrough, and walls for deflecting discharge gases from said gun; and outlet means connected to said chamber, said outlet means including a passage for conducting said gases away from said chamber and discharging the same at a location remote from said engine air inlet.

8. In combination with an aircraft having a forwardly discharging gun disposed rearwardly of and in proximity with an engine air inlet, an engine protective device comprising chamber means disposed adjacent the muzzle opening of said gun, said chamber means having side walls and an end wall opposite said muzzle; a relatively small open tubular member projecting from said end wall toward said gun in axial alignment with the bore thereof for permitting passage of a projectile from said gun, one of said side walls having an opening to permit dispersal of discharge gases which have entered said chamber means from said gun; a second and larger open tubular member projecting on the opposite side of said end wall and in the opposite direction from said firstly mentioned tubular member; and baffle means between said engine air intake and said second tubular member extending adjacent said axis of said gun bore for deflecting additional gun discharge gases away from said engine air intake.

9. In combination with an aircraft having a forwardly discharging gun disposed rearwardly of and in proximity with an engine air inlet, an engine protective device comprising chamber means disposed adjacent the muzzle opening of said gun, said chamber means having side walls and an end wall opposite said muzzle; a relatively small open tubular member projecting from said end wall toward said gun in axial alignment with the bore thereof for permitting passage of a projectile from said gun, one of said side walls having an opening to permit dispersal of discharge gases which have entered said chamber means from said gun; and a second and larger open tubular member projecting on the opposite side of said end wall and in the opposite direction from said firstly mentioned tubular member.

10. In combination with an aircraft having a gun firing in proximity with an engine air inlet, an engine protective installation comprising chamber means along the path of discharge of said gun adjacent the muzzle outlet thereof for thereby receiving discharge gases therefrom, said chamber means having a restricted outlet for permitting a projectile from said gun to pass freely therethrough; and a second outlet means for exhausting said discharge gases from said chamber means arranged to direct the same to a location remote from said engine air inlet.

References Cited in the file of this patent

UNITED STATES PATENTS

| | | |
|---|---|---|
| 2,273,839 | De Port et al. | Feb. 24, 1942 |
| 2,402,632 | Ivanovic | June 25, 1946 |